United States Patent
Heap et al.

(10) Patent No.: US 9,002,559 B2
(45) Date of Patent: Apr. 7, 2015

(54) METHOD AND APPARATUS FOR CONTROLLING A MULTI-MODE POWERTRAIN SYSTEM

(71) Applicant: GM Global Technology Operations LLC, Detroit, MI (US)

(72) Inventors: Anthony H. Heap, Ann Arbor, MI (US); Kee Yong Kim, Ann Arbor, MI (US); Ryan D. Martini, Wolverine Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/860,767

(22) Filed: Apr. 11, 2013

(65) Prior Publication Data
US 2014/0309823 A1 Oct. 16, 2014

(51) Int. Cl.
*B60W 20/00* (2006.01)
*B60W 10/06* (2006.01)
*B60W 10/08* (2006.01)

(52) U.S. Cl.
CPC ............... *B60W 20/20* (2013.01); *B60W 10/06* (2013.01); *B60W 10/08* (2013.01); *B60W 2600/00* (2013.01); *Y10S 903/93* (2013.01)

(58) Field of Classification Search
USPC ........................................ 701/22; 180/65.265
See application file for complete search history.

(56) References Cited

U.S. PATENT DOCUMENTS

2009/0118935 A1 * 5/2009 Heap et al. ...................... 701/54

* cited by examiner

*Primary Examiner* — Mary Cheung
*Assistant Examiner* — Yuen Wong

(57) ABSTRACT

A method for operating a powertrain system to transfer torque among an engine, torque machines, and a driveline in response to an output torque request includes executing a selection scheme to evaluate operating in a plurality of candidate powertrain states including a pseudo-electric vehicle (EV) range responsive to the output torque request. A respective minimum cost for operating the powertrain system in each of the candidate powertrain states including the pseudo-EV range is determined. A preferred powertrain state is selected, and is one of the candidate powertrain states including the pseudo-EV range associated with a minimum of the respective minimum costs. The powertrain system is controlled in the preferred powertrain state responsive to the output torque request.

6 Claims, 4 Drawing Sheets

METHOD AND APPARATUS FOR CONTROLLING A MULTI-MODE POWERTRAIN SYSTEM

TECHNICAL FIELD

This disclosure is related to dynamic system controls associated with multi-mode powertrain systems employing multiple torque-generative devices.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for operating a powertrain system to transfer torque among an engine, torque machines, and a driveline in response to an output torque request includes executing a selection scheme to evaluate operating in a plurality of candidate powertrain states including a pseudo-electric vehicle (EV) range responsive to the output torque request. A respective minimum cost for operating the powertrain system in each of the candidate powertrain states including the pseudo-EV range is determined. A preferred powertrain state is selected, and is one of the candidate powertrain states including the pseudo-EV range associated with a minimum of the respective minimum costs. The powertrain system is controlled in the preferred powertrain state responsive to the output torque request.

BRIEF DESCRIPTION OF THE DRAWINGS

One or more embodiments will now be described, by way of example, with reference to the accompanying drawings, in which:

FIGS. 4-1 and 4-2 illustrate engine and transmission power loss operation, in accordance with the disclosure.

DETAILED DESCRIPTION

Figure 1:
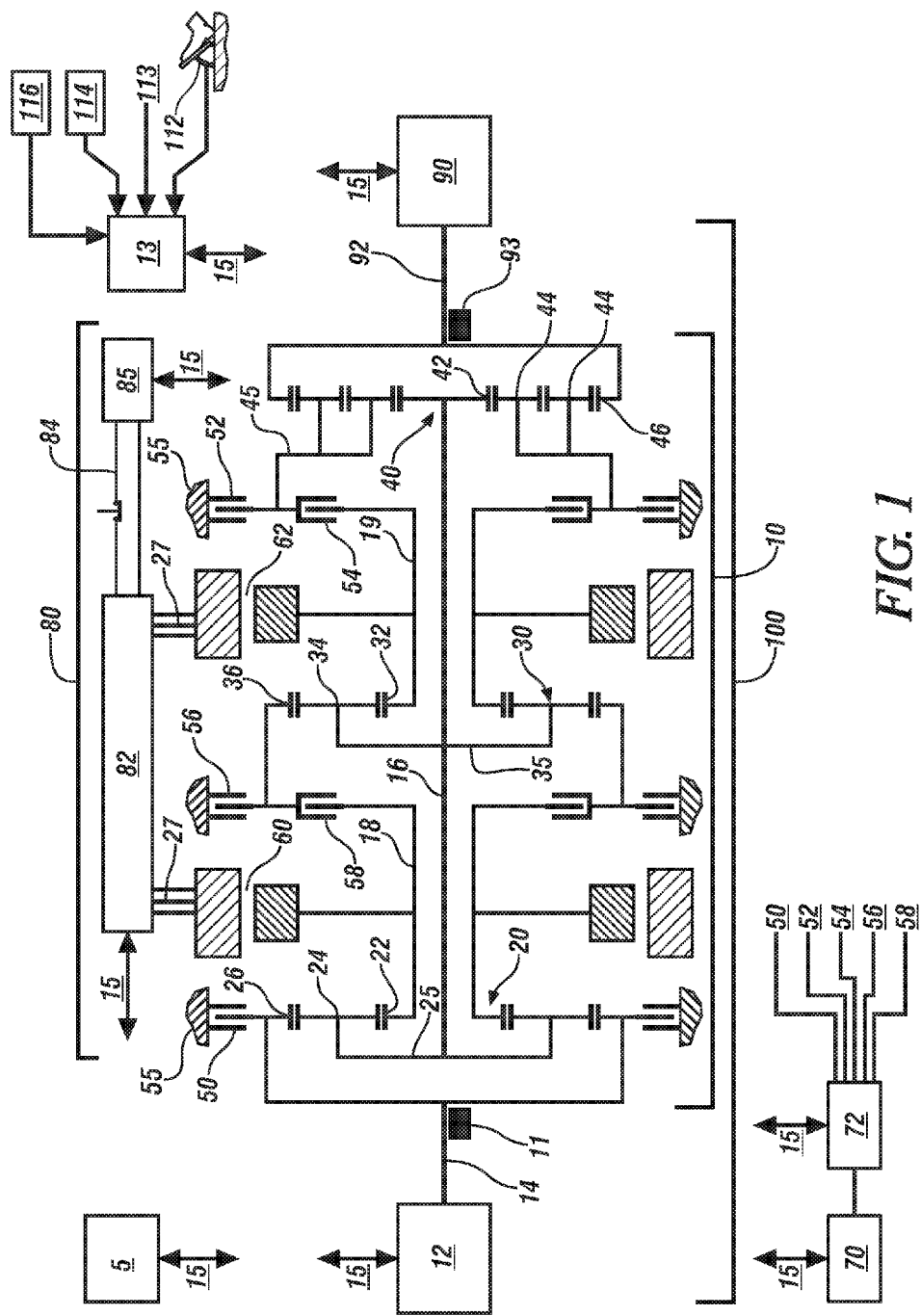
FIG. 1 illustrates a multi-mode powertrain system including an internal combustion engine, transmission, and a driveline configured with a rear-wheel drive differential, in accordance with the disclosure.

Referring now to the drawings, wherein the showings are for the purpose of illustrating certain exemplary embodiments only and not for the purpose of limiting the same, FIG. 1 depicts a non-limiting multi-mode powertrain system 100 including an internal combustion engine (engine) 12, a multi-mode transmission (transmission) 10, a high-voltage electrical system 80, a driveline 90, and a controller 5. The transmission 10 mechanically couples to the engine 12 and first and second torque machines 60 and 62, respectively, and is configured to transfer torque among the engine 12, the torque machines 60, 62, and the driveline 90. As illustrated, the first and second torque machines 60, 62 are electric motor/generators. The driveline 90 includes a differential system that facilitates a rear-wheel drive vehicle configuration. Alternatively, the powertrain system can be a front-wheel drive configuration.

The high-voltage electrical system 80 includes an electrical energy storage device, e.g., a high-voltage battery (battery) 85 electrically coupled to a transmission power inverter control module (TPIM) 82 via a high-voltage electrical bus 84, and is configured with suitable devices for monitoring electric power flow including devices and systems for monitoring electric current and voltage. The battery 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14. Power output from the engine 12, i.e., engine speed and engine torque, can differ from input speed and input torque to the transmission 10 due to placement of torque-consuming components on the input member 14 between the engine 12 and the transmission 10, e.g., a torque management device or a mechanically-powered hydraulic pump. The engine 12 is configured to execute autostop and autostart operations during ongoing powertrain operation in response to operating conditions. The controller 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60, 62.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to the first and second torque machines 60, 62. The transmission 10 is configured to transfer torque among the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or another suitable device in this embodiment. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the battery 85. The battery 85 is high voltage DC-coupled to the TPIM 82 via the high-voltage electrical bus 84 that preferably include a contactor switch that permits or prohibits flow of electric current between the battery 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors (IGBTs) for converting DC power from the battery 85 to AC power for powering respective ones of the first and second torque machines 60 and 62, by switching at high frequencies. The IGBTs form a switch mode power supply configured to receive control commands. Each phase of each of the three-phase electric machines includes a pair of IGBTs. States of the IGBTs are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the battery 85 to charge and discharge the battery 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of battery 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system, and includes commanding an output torque request and selecting a transmission range. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The operator-selectable positions of the transmission range selector 114 can correspond directly to individual transmission ranges described with reference to Table 1, or may correspond to subsets of the transmission ranges described with reference to Table 1. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals referred to as loop cycles, for example each 3.125, 6.25, 12.5, 25 and 100 milliseconds during ongoing engine and vehicle operation. Alternatively, routines may be executed in response to occurrence of an event.

The multi-mode powertrain 100 is configured to operate in one of a plurality of powertrain states, including a plurality of transmission ranges and engine states to generate and transfer torque to the driveline 90. The engine states include an ON state and an OFF state. The engine is considered to be in the ON state when the engine is spinning. The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing, and not generating torque. The engine ON state further includes a fuel cutoff (FCO) state, wherein the engine is spinning with all of the cylinders unfueled and not firing, and thus not generating torque. When the engine is in the OFF state, it is not spinning. In one embodiment, operating with the engine in the OFF state can be accomplished by grounding rotation of the input member to the transmission case using a clutch or similar device. By way of example, the powertrain 100 shown with reference to FIG. 1 can operate with the engine 12 in the OFF state, i.e., not spinning by activating clutch C5 50 to ground rotation of the input member 14 to the transmission case 55 with speeds of the first and second torque machines 60, 62 controlled to achieve an output speed and output torque that are responsive to the output torque request. Alternatively or in addition, operating with the engine in the OFF state can be accomplished by controlling rotational speeds of the torque machines to achieve an input speed that is zero and an output speed and output torque that are responsive to the output torque request. The output torque request includes a positive output torque request leading to vehicle acceleration and/or steady-state cruising operation. When the engine operates in the FCO state, the engine is spinning but is unfueled and not firing. The engine can operate in the FCO state in response to an operator command for vehicle deceleration, such as occurs when the operator lifts their foot from the accelerator pedal 112, referred to as a decel-fuel cutoff state (dFCO). The engine can be commanded to operate in the FCO state under other conditions that are described herein.

The transmission ranges include a plurality of neutral (neutral), fixed gear (Gear #), variable mode (EVT Mode #), electric vehicle (EV #) and transitional (EV Transitional Range# and Pseudo-gear #) ranges that are achieved by selectively activating the clutches C1 50, C2 52, C3 54, C4 56, and C5 58. The pseudo-gear ranges are variable mode transmission ranges in which magnitude of torque output from the transmission to the driveline correlates to magnitude of the engine input torque, taking into account torque losses associated with torque-consuming components on the input member 14. The pseudo-gear range(s) can be employed as intermediate transmission ranges during shifts among EVT Mode ranges, and can also be employed as steady-state transmission operating states. Table 1 depicts a plurality of powertrain states including transmission ranges and engine states for operating the multi-mode powertrain 100, wherein "x" indicates an activated clutch for the transmission range.

TABLE 1

| Range | Engine State | C1 | C2 | C3 | C4 | C5 |
|---|---|---|---|---|---|---|
| Neutral 1 | ON(ALL/DEAC/dFCO) | | | | | |
| Neutral 2 | ON(ALL/DEAC/dFCO) | | | x | | |

TABLE 1-continued

| Range | Engine State | C1 | C2 | C3 | C4 | C5 |
|---|---|---|---|---|---|---|
| Neutral 3 | ON(ALL/DEAC/dFCO) | | | | x | |
| Pseudo-gear 1 | ON(ALL/DEAC/dFCO) | x | | | | |
| Pseudo-gear 2 | ON(ALL/DEAC/dFCO) | | x | | | |
| Neutral | OFF | | | | | x |
| EVT Mode 1 | ON(ALL/DEAC/dFCO) | x | | x | | |
| EVT Mode 2 | ON(ALL/DEAC/dFCO) | x | | | x | |
| EVT Mode 3 | ON(ALL/DEAC/dFCO) | | | x | x | |
| EVT Mode 4 | ON(ALL/DEAC/dFCO) | | | x | x | |
| EV Transitional State 1 | OFF | x | | | | x |
| EV Transitional State 2 | OFF | | x | | | x |
| Gear 1 | ON(ALL/DEAC/dFCO) | x | | x | x | |
| Gear 2 | ON(ALL/DEAC/dFCO) | x | x | | x | |
| Gear 3 | ON(ALL/DEAC/dFCO) | | x | x | x | |
| EV1 | OFF | x | | x | | x |
| EV2 | OFF | x | | | x | x |
| EV3 | OFF | | | x | x | x |
| EV4 | OFF | | | x | x | x |
| EV Transitional State 3 | OFF | x | x | | | x |
| Neutral | OFF | | | x | x | |
| Pseudo-gear 3 | ON(ALL/DEAC/dFCO) | x | x | | | |
| Neutral | OFF | | | x | | x |
| Neutral | OFF | | | | x | x |

The powertrain states for operating the multi-mode powertrain 100 further include a plurality of pseudo-EV ranges wherein the first and second torque machines 60, 62 are controlled to generate and transfer torque to the driveline 90 in response to the output torque request and the engine 12 is operating in the fuel cutoff (FCO) state, i.e., with the engine spinning unfueled. Table 2 depicts powertrain states including a plurality of pseudo-EV ranges for operating the multi-mode powertrain 100, wherein "x" indicates an activated clutch for the transmission range.

TABLE 2

| Pseudo-EV Range | Engine State | C1 | C2 | C3 | C4 | C5 |
|---|---|---|---|---|---|---|
| P-EVT Mode 1 | ON(FCO) | x | | x | | |
| P-EVT Mode 2 | ON(FCO) | x | | | x | |
| P-EVT Mode 3 | ON(FCO) | | x | | x | |
| P-EVT Mode 4 | ON(FCO) | | | x | x | |
| P-Gear 1 | ON(FCO) | x | | x | x | |
| P-Gear 2 | ON(FCO) | x | x | | x | |
| P-Gear 3 | ON(FCO) | | x | x | x | |

The pseudo-EV ranges facilitate operating the powertrain system to generate positive tractive torque to effect vehicle acceleration with the engine spinning in an unfueled state, i.e., the FCO state. Operation in one of the pseudo-EV ranges permits EV-like behavior such as operating in a fuel-off opportunity discharge mode when the engine OFF state is unavailable due to other operating conditions.

Operation in one of the pseudo-EV ranges may result in lower total system power loss than the EV ranges under similar conditions responsive to an output torque request. Such total system power loss is due to lower transmission spin losses and motor/inverter losses that offset increased engine losses caused by engine pumping, bearing friction, and valve spring resistances with the engine spinning in the FCO state. Furthermore, a permissible engine speed range with the engine spinning in the FCO state can be less than engine idle speed to an engine speed that is 0 RPM or another suitable calibrated engine speed. The powertrain system may generate greater output torque when operating in one of the pseudo-EV ranges as compared to an equivalent EV range under the same conditions because the torque machines may be controlled to operate at operating points at which they can generate greater torque. Similarly, the powertrain system may have greater output speed range when operating in one of the pseudo-EV ranges as compared to an equivalent EV range under the same conditions because the input speed is not necessarily limited to 0 RPM when the engine is operating in the FCO state. Furthermore, operation in one of the pseudo-EV ranges may increase operating stability and reduce shift busyness as compared to EV ranges under the same conditions. One method of increasing operating stability and reducing shift busyness may include biasing costs (described with reference to FIG. 3) against operating with the engine fueled when the powertrain system is operating in one of the pseudo-EV ranges. By way of example, operation in EV1 range, i.e., in mode M1 with the engine OFF may be speed-limited to 80 km/h (50 MPH) due to capacity of the torque machines. The operation may select between operating in P-EVT Mode 1 and EVT Mode 1, i.e., with the engine in the ON state, based upon the costs. Such operation ensures wider operating engine/transmission speed range in the FCO mode, while making a trade-off between efficiency and EV operation. This may provide an additional benefit of permitting extended operation of the powertrain system in an extended range electric vehicle (EREV) state, thus reducing overall fuel consumption and improving fuel economy.

Figure 2:
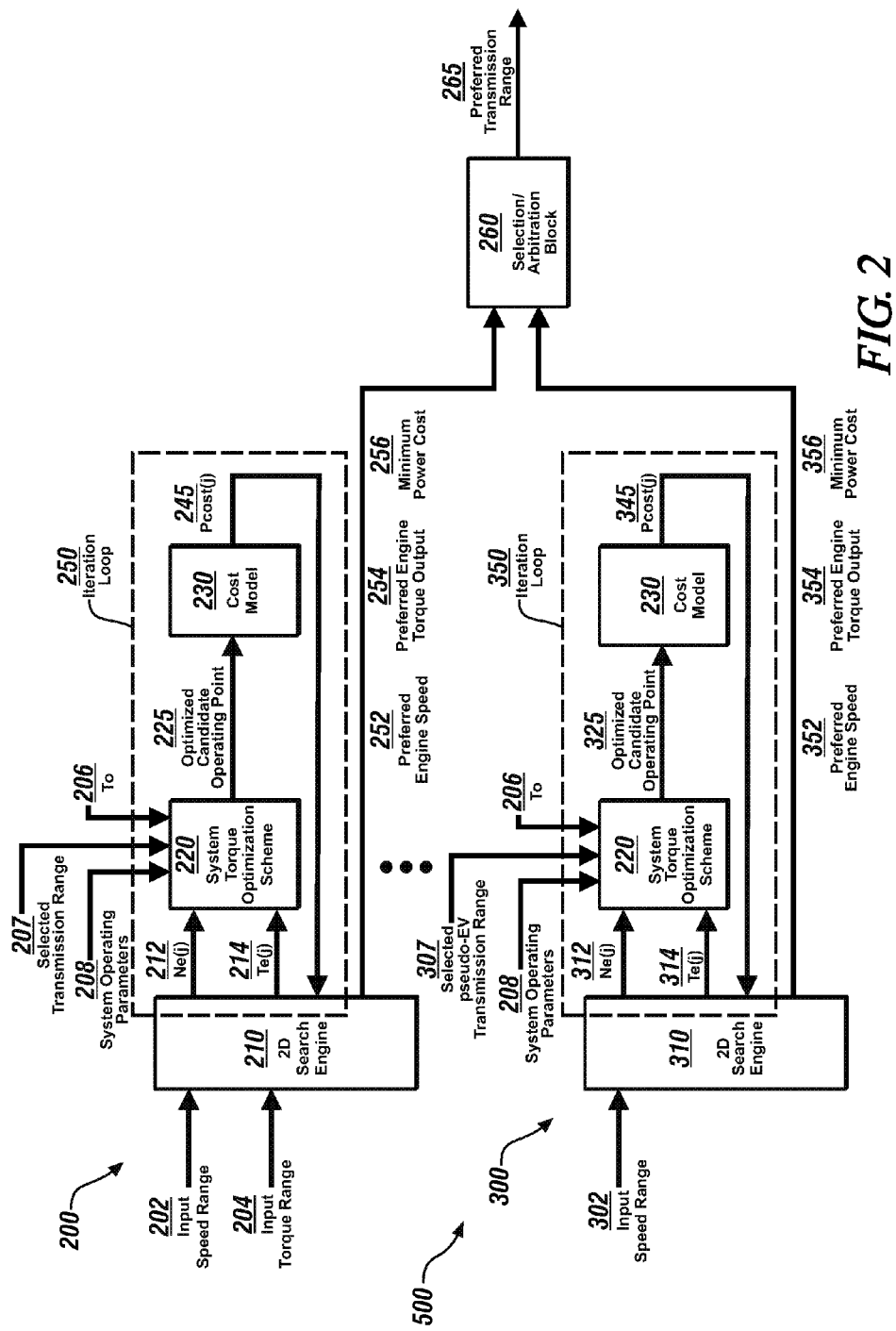
FIG. 2 illustrates a search scheme for determining a preferred engine operating point and preferred transmission operating range when operating the multi-mode powertrain system of FIG. 1 in response to an output torque request, in accordance with the disclosure.

FIG. 2 schematically shows a powertrain state selection scheme 500 including a plurality of search schemes 200, . . . and at least one or a plurality of pseudo-EV search schemes 300. The plurality of pseudo-EV search schemes 300 include systems having multiple pseudo-EV operating ranges, e.g., as described with reference to Table 2. Each of the search schemes 200, . . . evaluates operation of the powertrain system in one of a first set of candidate transmission ranges 207 in response to an output torque request 206 based upon powertrain system operating parameters 208. The first set of candidate transmission ranges 207 includes all or a portion of the transmission ranges described with reference to Table 1. Each of the search schemes 200, . . . determines a minimum power cost 256 and corresponding candidate operating point 252, 254 for operating the powertrain system in the candidate transmission range 207 in response to the output torque request 206.

Each of the pseudo-EV search schemes 300, . . . evaluates operation of the powertrain system in one of a second set of candidate transmission ranges 307 in response to the output torque request 206 based upon the powertrain system operating parameters 208. The second set of candidate transmission ranges 307 includes all or a portion of the pseudo-EV transmission ranges described with reference to Table 2. Each of the search schemes 300, . . . determines a minimum power cost 356 and corresponding candidate operating point 352, 354 for operating the powertrain system in the candidate pseudo-EV transmission range 307 in response to the output torque request 206. The search schemes 200, . . . and 300, . . . are preferably executed simultaneously, i.e., within the same loop cycle.

The minimum power costs 256 and the minimum power costs 356 are comparatively evaluated in a selection/arbitration block 260, which acts to select one of the candidate transmission ranges 207 or one of the candidate pseudo-EV ranges 307 having a minimum of the minimum power costs 256, . . . 356, . . . as a preferred transmission range 265 for controlling the transmission 10 with corresponding engine control operation. The selection/arbitration block 260 employs hysteresis and other tactics to minimize shift busyness. The preferred engine speed 252 and preferred engine torque 254 can be employed to control operation of the engine 12 in the selected transmission range 207, with operation of the powertrain system 100 corresponding thereto.

The search scheme 200 operates as follows. Ranges 202 and 204 are provided to the two-dimensional search engine (search engine) 210. The ranges 202 and 204 may include a range of input or engine speeds, a range of input or engine torques, a range of clutch slip speeds, a range of normalized input powers, or other suitable controllable inputs. In one embodiment and as described herein, the range 202 is an input speed range and range 204 is an input torque range. The search engine 210 iteratively generates a plurality of candidate engine speeds Ne(j) 212 across the input speed range 202 and a plurality of candidate engine torques Te(j) 214 across the input torque range 204, each which is input to an iteration loop 250. The designation (j) indicates an individual iteration. By way of a non-limiting example, the input speed may include 0 RPM for the engine in the OFF state and range from engine idle to a maximum engine speed (redline) for the engine in the ON state. Thus candidate engine speeds Ne(j) 212 may include engine speeds of 0 (OFF), 700 (idle), 1000, 1500, 2000, 2500, 3000, 4500, and 6000 RPM. By way of a non-limiting example, the input torque range may encompass 0%-100% of maximum engine torque and candidate engine torques Te(j) 214 may include 0, 10%, 20%, 30%, 40%, 50%, 75% and 100% of maximum engine torque.

The iteration loop 250 employs a system torque optimization scheme 220 and a cost model 230 to calculate a candidate cost Pcost(j) 245 for each candidate engine speed Ne(j) 212 and each candidate engine torque Te(j) 214. The search engine 210 monitors the candidate costs Pcost(j) 245 for all iterations. The candidate engine speed Ne(j) 212 and candidate engine torque Te(j) 214 that achieve a minimum of the candidate costs Pcost(j) 245 are selected by the search engine 210 as the preferred engine speed 252 and preferred engine torque 254. The preferred engine speed 252, preferred engine torque 254, and corresponding minimum cost 256 are identified based upon execution of a plurality of iteration loops across the input speed range 202 and engine torque range 204.

The system torque optimization scheme 220 determines an optimized candidate powertrain operating point 225, including motor torque commands Ta, Tb for controlling the first and second torque machines to achieve the output torque request To 206 in response to the candidate engine speed Ne(j) 212 and the candidate engine torque Te(j) 214 when operating in the selected transmission range 207 and based upon powertrain system operating parameters 208. The powertrain system operating parameters 208 include operating limits for the first and second torque machines, e.g., minimum and maximum torques and minimum and maximum speeds, and operating limits for the battery, e.g., battery power limits including maximum discharge limits and maximum charge limits. The optimized candidate powertrain operating point 225 includes preferred operating parameters for the first and second torque machines, e.g., torque and speed, and preferred operating parameters for the battery, e.g., battery power, in response to the output torque request 206 when the engine is operating at the candidate engine speed Ne(j) 212 and the candidate engine torque Te(j) 214 and the transmission is operating in the selected transmission range 207.

The cost model 230 preferably determines a total cost 245 including power costs and driveability costs associated with operating the powertrain at the candidate powertrain operating point 225. An exemplary power cost function is described with reference to FIG. 3. Driveability costs include an assessment of factors related to operator and passenger perceptions and experiences related to vehicle noise, vibration, and harshness. One vehicle noise issue of concern includes low frequency gear and/motor noise occurring at low speeds that resonates in a vehicle chassis. The driveability costs increase with increased vehicle noise, vibration, and harshness. A skilled practitioner is able to develop a driveability costing function that assigns costs employing objective and/or subjective criteria that correspond to operator and passenger perceptions and experiences related to vehicle noise, vibration, and harshness using one or more of vehicle simulations, on-vehicle measurements, on-vehicle assessments, and in-use results.

The search scheme 200 determines a preferred engine speed 252, a preferred engine torque output 254, and corresponding minimum power cost 256 when operating the powertrain system 100 in response to the output torque request 206 with the transmission 10 in the first candidate transmission range 207.

The pseudo-EV search scheme 300 operates as follows. Range 302 is provided to the two-dimensional search engine (search engine) 210, and preferably includes a range of input or engine speeds, or another suitable controllable input. There is a substantially linear relation between input speed and input torque when the engine is spinning in the FCO state caused by engine pumping, bearing friction, and valve spring resistances. Thus, input torque can be determined in relation to input speed. The search engine 210 iteratively generates a plurality of candidate engine speeds Ne(j) 312 across the input speed range 302 and a corresponding plurality of candidate engine torques Te(j) 314, each which is input to an iteration loop 350. The designation (j) indicates an individual iteration. By way of a non-limiting example, the input speed range may encompass 0 to 4000 RPM and the candidate engine speeds Ne(j) 312 may include speeds of 0, 500, 1000, 1500, 2000, 2500, 3000 and 4000 RPM.

The iteration loop 350 employs the system torque optimization scheme 220 and the cost model 230 to calculate a candidate cost Pcost(j) 345 for each candidate engine speed Ne(j) 312 and each candidate engine torque Te(j) 314. The search engine 310 monitors the candidate costs Pcost(j) 345 for all iterations. The candidate engine speed Ne(j) 312 and candidate engine torque Te(j) 314 that achieve a minimum of the candidate costs Pcost(j) 345 are selected by the search engine 310 as the preferred engine speed 352 and preferred engine torque 354. The preferred engine speed 352, preferred engine torque 354, and corresponding minimum cost 356 are identified based upon execution of a plurality of iteration loops across the input speed range 302.

The system torque optimization scheme 220 operates as previously described to determine an optimized candidate powertrain operating point 325, including motor torque commands Ta, Tb for controlling the first and second torque machines to achieve the output torque request To 206 in response to the candidate engine speed Ne(j) 312 and the candidate engine torque Te(j) 314 when operating in the selected pseudo-EV transmission range 307 and based upon powertrain system operating parameters 208. The cost model 230 preferably determines a total cost 345 including power costs and driveability costs associated with operating the powertrain at the candidate powertrain operating point 325. The search scheme 300 determines a preferred engine speed 352 and corresponding minimum power cost 356 when operating the powertrain system 100 in response to the output torque request 206 with the transmission 10 in the candidate pseudo-EV transmission range 207.

Figure 3:
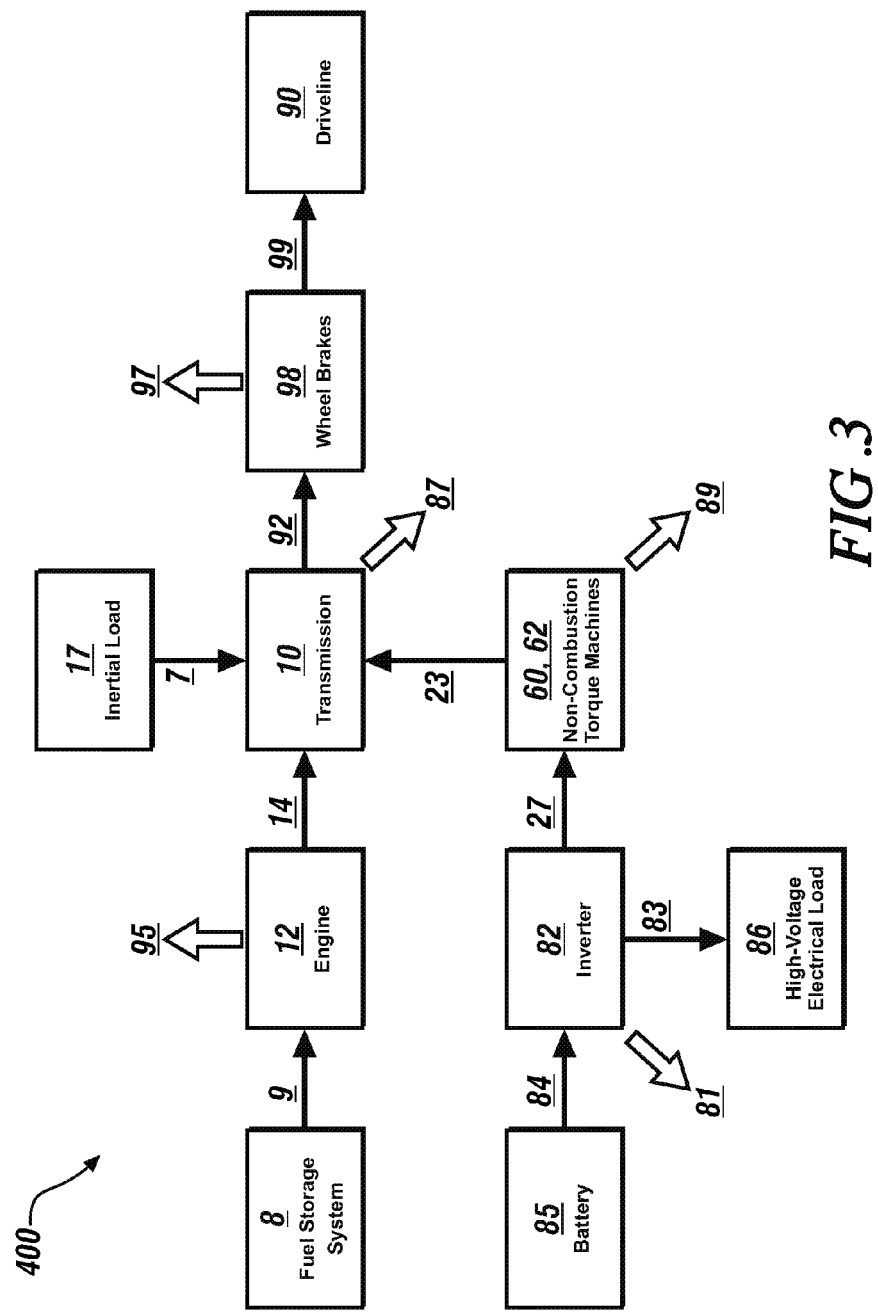
FIG. 3 illustrates a power cost function including an analytic framework for determining powertrain system operating costs, in accordance with the disclosure.

FIG. 3 schematically illustrates an exemplary power cost function 300 including an analytic framework for determining powertrain system operating costs, which is described with reference to the multi-mode powertrain system 100 described with reference to FIG. 1. Powertrain elements include engine 12, transmission 10, non-combustion torque machines 60, 62, battery 85, inverter 82, wheel brakes 98, driveline 90, and a fuel storage system 8. Pseudo-elements include an inertial load 17, which is an element constructed to account for system inertias, and high-voltage electrical load 86, which is an element constructed to account for high-voltage loads in the vehicle outside that load used for propulsion of the powertrain system 100. Power flow paths include a first power flow path 9 from the fuel storage system 8 to transfer fuel power to the engine 12, a second power flow path 14 between the engine 12 and the transmission 10, and third power flow path 84 between the battery 85 and the inverter 82, a fourth power flow path 83 between the inverter 82 and the high-voltage electrical load 86, and fifth power flow path 27 between the inverter 82 and the non-combustion torque machines 60, 62, a sixth power flow path 23 between the non-combustion torque machines 60, 62 and the transmission 10, and seventh power flow path 7 between the inertial load 17 and the transmission 20, an eighth power flow path 92 between the transmission 10 and the wheel brakes 98, and a ninth power flow path 99 to the driveline 90. Power losses include engine power losses 95, battery power losses 81, mechanical power losses 87, electric motor losses 89, and brake power losses 97. The power cost inputs to the power cost function 300 are determined based upon factors related to vehicle drivability, fuel economy, emissions, and battery usage. Power costs are assigned and associated with fuel and electrical power consumption and are associated with specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 95, electric motor power losses 89, battery power losses 81, brake power losses 97, and mechanical power losses 87 associated with operating the multi-mode powertrain at specific operating points for the engine 10 and the non-combustion torque machines 60, 62.

The mechanical power losses 87 include power losses due to rotational spinning, torque transfer, and friction, and operation of parasitic loads, e.g., a hydraulic pump for the transmission. The mechanical power loss can be determined for each of the transmission ranges at selected input speeds.

The power cost function 300 may be employed to determine a total power cost for operating at a selected engine operating point while operating the powertrain system responsive to an output torque request.

Figures 1, 4:
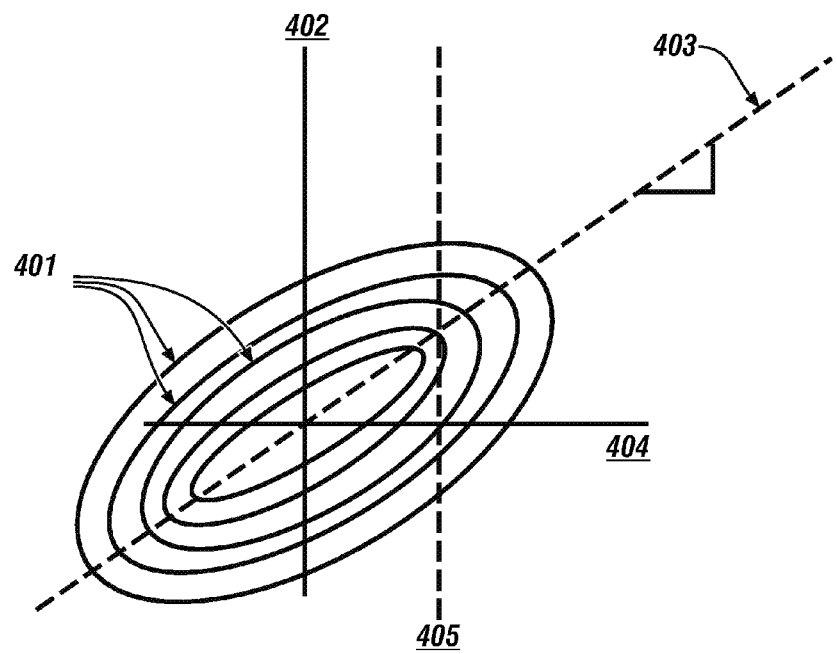
Figures 2, 4:
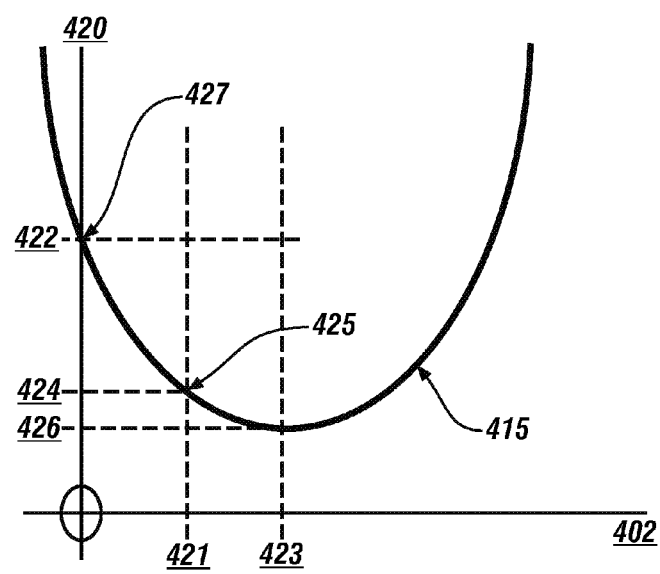

FIG. 4-1 graphically shows transmission input speed Ni 402 on the vertical axis and transmission output speed No 404 on the horizontal axis, and shows a plurality of transmission spin loss states 401 plotted based upon a relationship between the transmission input speed Ni and transmission output speed No for a known transmission. Line 403 graphically depicts a line of minimum spin loss for the known transmission over the range in input speeds 402 and output speeds 404. A single state 405 for the transmission output speed No is selected for reference.

FIG. 4-2 graphically shows the transmission input speed Ni 402 on the horizontal axis and power loss 420 on the vertical axis, and shows transmission spin loss 415 corresponding to the single state 405 for the transmission output speed No that is shown with reference to FIG. 4-1. The transmission spin loss 415 varies in relation to the input speed Ni 402, and achieves a minimum power loss state 426 at input speed point 423, and increases to a power loss state 422 when the input speed is 0 RPM, shown at point 421. The data indicates that there may be an intermediary point, e.g., point 425, at which the transmission spin loss 424 is equal to or less than engine pumping loss at an associated engine speed 421. Thus, powertrain operation that includes engine spinning in the FCO state may demonstrate a lower overall power loss than powertrain operation that with the engine speed held at 0 RPM in some circumstances, and the powertrain system can preferentially select such an operating point including operating in one of the FCO states in response to an output torque request.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system including a multi-mode transmission configured to transfer torque among an engine, torque machines, and a driveline, comprising:
   in response to an output torque request:
      executing a selection scheme to evaluate operating the powertrain system in a plurality of candidate powertrain states including in a pseudo-electric vehicle (pseudo-EV) range responsive to the output torque request, the pseudo-EV range comprising generating positive tractive torque to effect vehicle acceleration with the engine operating in a fuel cutoff state with the engine spinning;
      determining a respective minimum cost for operating the powertrain system in each of the candidate powertrain states including the pseudo-EV range;
      selecting a preferred powertrain state comprising one of the candidate powertrain states including the pseudo-EV range associated with a minimum of the respective minimum costs; and
      controlling the powertrain system in the preferred powertrain state responsive to the output torque request and operating the powertrain system in the preferred powertrain state.

2. The method of claim 1, wherein operating the powertrain system in the pseudo-EV range further comprises operating the engine in a fuel cutoff state with the engine spinning and controlling the torque machines to transfer torque to the driveline responsive to the output torque request.

3. The method of claim 2, wherein determining the respective minimum cost for operating the powertrain system in the pseudo-EV range comprises:
   generating a plurality of candidate engine speeds and corresponding engine torques associated with operating the engine in a fuel cutoff state with the engine spinning;
   determining an optimized candidate powertrain operating point to achieve the output torque request when operating in the pseudo-EV range and a corresponding candidate cost for each candidate engine speed and candidate engine torque; and
   selecting a minimum of the candidate costs and corresponding candidate engine speeds and candidate engine torques.

4. The method of claim 2, wherein generating a plurality of candidate engine speeds associated with operating the engine in a fuel cutoff state with the engine spinning comprises generating a plurality of engine speeds over an engine speed range between 0 RPM and an engine idle speed.

5. The method of claim 2, wherein determining the optimized candidate powertrain operating point to achieve the output torque request when operating in the pseudo-EV range comprises determining optimum motor torque commands for the torque machines to achieve the output torque request when operating in the pseudo-EV range.

6. A method for operating a powertrain system including a multi-mode transmission configured to transfer torque among an engine, torque machines, and a driveline, comprising:

in response to an output torque request:
executing a selection scheme to evaluate operating the powertrain system in a plurality of candidate powertrain states including in a pseudo-electric vehicle (pseudo-EV) range responsive to the output torque request, wherein operating the powertrain system in the pseudo-EV range comprises;
operating the engine in a fuel cutoff state with the engine spinning and controlling the torque machines to transfer torque to the driveline responsive to the output torque request; and
generating a plurality of engine torques associated with engine pumping, bearing friction, and valve spring resistance for each of the engine speeds over the engine speed range between 0 RPM and the engine idle speed;

determining a respective minimum cost for operating the powertrain system in each of the candidate powertrain states including the pseudo-EV range;

selecting a preferred powertrain state comprising one of the candidate powertrain states including the pseudo-EV range associated with a minimum of the respective minimum costs; and controlling the powertrain system in the preferred powertrain state responsive to the output torque request and operating the powertrain system in the preferred powertrain state.

\* \* \* \* \*